UNITED STATES PATENT OFFICE.

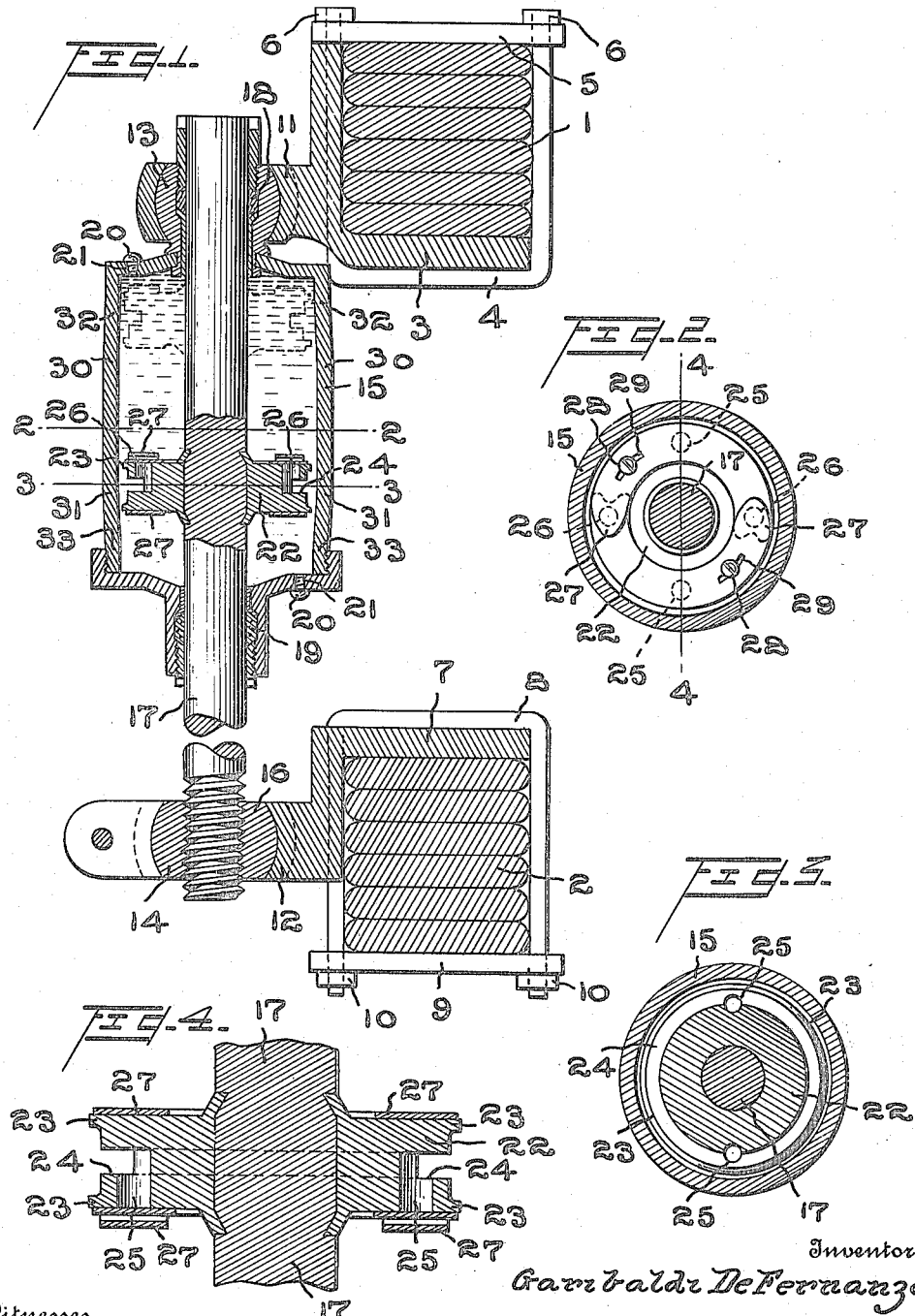

GARIBALDI DE FERNANZO, OF PHILADELPHIA, PENNSYLVANIA.

SHOCK-ABSORBER.

1,143,753.  Specification of Letters Patent.  Patented June 22, 1915.

Application filed June 8, 1914. Serial No. 843,685.

*To all whom it may concern:*

Be it known that I, GARIBALDI DE FERNANZO, a citizen of the United States, residing at Philadelphia, in the county of Philadelphia and State of Pennsylvania, have invented certain new and useful Improvements in Shock-Absorbers, of which the following is a specification.

My invention relates to improvements in shock absorbers, the object of the invention being to provide a shock absorber designed to connect two members which are movable relative to each other, and which prevents jars and jolts, yet allows the parts to move gradually and with increasing resistance toward and away from each other, and which further operates as a positive check to prevent movement beyond a certain point, yet allows the parts to return easily to normal position.

A further object is to provide a shock absorber designed primarily to connect two springs or one spring with a fixed part and in which a liquid containing casing is provided with a piston having an improved arrangement of passages and ports in combination with an improved shape of casing, whereby the by-passing of the liquid is controlled and the resistance to such by-passing increases when the parts move relative to each other in either direction from normal.

A further object is to provide a shock absorber which may be manufactured and sold at a reasonably low price, and which will be strong and durable in use.

A further object is to improve upon the constructions disclosed in my pending applications, one of which was filed May 19, 1914, and given Serial No. 839,492 and the other filed April 13, 1914, and given Serial No. 831,361.

With these and other objects in view, the invention consists in certain novel features of construction and combinations and arrangements of parts as will be more fully hereinafter described and pointed out in the claims.

In the accompanying drawings: Figure 1 is a view in vertical section illustrating my improvements showing in full lines the position of the piston and cylinder relative to each other before any considerable load is supported and in dotted lines showing one extreme position of the piston. Fig. 2 is a view in section on the line 2—2 of Fig. 1. Fig. 3 is a view in section on the line 3—3 of Fig. 1, and Fig. 4 is a view in section on an enlarged scale on the line 4—4 of Fig. 2.

1 and 2 represent supporting members for the respective ends of my improved shock absorber, and while in the present instance I have illustrated these supporting members as constituting the two sections of an elliptical spring, I would have it understood that the invention is not limited to any such use, but may be applied to any supports in which one of the supports is movable relative to the other.

An angle bracket 3 is secured to the upper support 1 by means of U-bolts 4 which extend under the horizontal member of the angle bracket, and through transverse bars 5 on the upper edge of the support, said U-bolts having nuts 6 on their ends to clamp the parts together.

An angle bracket 7 is secured to the lower support 2 by means of U-bolts 8 which extend over the horizontal member of the angle bracket 7 which is on top of the support, and at their lower ends project through a transverse bar 9 and are secured by nuts 10.

The brackets 3 and 7 are provided with sockets 11 and 12 respectively for the accommodation of balls 13 and 14. The ball 13 constitutes a fixed part of my improved casing 15. The ball 14 has a screw-threaded opening 16 for the reception of the screw-threaded end of a rod 17 which extends entirely through the casing and through stuffing boxes 18 and 19 in the respective ends of the casing.

These several details of construction are disclosed more fully in my applications above referred to, and hence need not be further described in this application except to say that the ball and socket connections permit the parts a sufficient amount of movement in any direction to compensate for the varying movements of the spring.

The casing 15 is provided with screws 20 closing openings 21 in the ends of the casing to allow the same to be filled or drained from either end, it being understood that the casing is filled with liquid.

On the rod 17 in casing 15, my improved piston 22 is rigidly secured. This piston 22 is provided at its upper and lower edges with annular flanges 23, and between the flanges, the piston is provided with an annular groove 24. This groove 24 communicates with ports 25 and 26 connecting the lower and upper faces of the piston with said groove.

While my improved shock absorber may be used in various positions, the ordinary position is that of vertical, and hence I use the terms upper and lower faces of the piston to more clearly define the construction and arrangement of ports. The ports 25 extend from the lower face of the piston to the upper wall of the groove 24, and are arranged at opposite sides of the piston. The ports 26 extend from the upper face of the piston to the lower wall of the groove 24, and at opposite sides of the piston, but are staggered relative to the ports 25 so that they are completely out of alinement with said passages 25.

On the upper and lower faces of the piston 22, I provide adjustable spring-pressed valves 27 which consist of overlapping metal plates adjustable by means of set screws 28 in slots 29. These valves are identical with the valves disclosed in my former application above referred to, and hence need not be described in detail except to say that they regulate the flow of liquid through the passages, permitting the flow in one direction and preventing it in the other, and also permitting an adjustment so as to regulate the by-passing through the ports.

The casing 15 is of largest diameter and is cylindrical in form intermediate its ends. This straight or cylindrical intermediate portion extends from a point 30 to a point 31. The wall of the cylinder at both ends then tapers inwardly from the point 30 to the point 32, and from the point 31 to the point 33. The extreme ends of the casing are then cylindrical or straight, but this straight portion at the ends is appreciably shorter than the thickness of the piston for a purpose which will hereinafter appear.

Fig. 1 illustrates the position of the parts which is desirable when the shock absorber is first installed on the vehicle, and before any load is placed thereon. As soon as the extreme load of the vehicle is upon the shock absorber, the casing will have moved downwardly so that the piston is approximately midway between the ends of the casing. When in this position, the liquid can pass freely around the flanges 23 of the piston and through the ports 25 and 26 in accordance with the direction of movement. As the diameter of the piston at its flanges 23 is approximately the same as the internal diameter of the casing at its ends, when the piston is in the center of the casing an appreciable space is provided all around the piston between the same and the wall of the casing. When a shock comes, and the upper spring member 1 moves downwardly, the casing 15 will be moved downwardly, so that the piston 22 will move toward the upper end of the casing. After the initial movement, which will be permitted by reason of the free by-passing of the liquid, the piston begins to approach the small diameter of the casing at the end. This resistance is gradual because of the incline of the walls of the casing between the points 30 and 32. During such movement, the upper valves 26 are closed and the liquid passes around the upper flange 23 into the groove 24, around the lower flange 23, and through the ports 25. If the shock is very great, the upper flange 23 will be moved far enough to enter the small diameter of casing at the upper end thereof, so that the by-passing of liquid will be practically shut off, hence preventing any possibility of further movement. As soon as the rebound takes place, however, the liquid can freely pass around the lower flange 23 because of the inclination of that portion of the casing, and this liquid will pass upwardly through the ports 26 during the downward movement of the piston or upward movement of the casing.

The operation of the piston and casing is the same in both directions as the casing inclines adjacent both ends, and is provided at both ends with a short length of the same diameter as the flanges of the piston, so that there is a positive check at both ends, a gradual check toward both ends, and a comparatively free movement intermediate the ends of the casing. As the cylindrical ends of the casing are shorter than the thickness of the piston, the liquid can pass through the periphery of the piston through the by-passing ports even in the extreme positions of the piston, hence there can be no position where the piston will be positively locked against movement.

While my invention is not limited to any exact proportions of the several parts, I preferably provide the ports 25 and 26 of a diameter or internal area equal to the combined area of the space between the piston flanges 23 and the wall of the casing when the piston is in an extreme position, so that there will be the least possible resistance against the return movement.

While the drawings are exaggerated in several particulars to better illustrate the invention, and the exact proportions are not attempted, it is possible with my improvements to so regulate the sizes of the passages and ports as to give to the shock absorber the precise amount of resistance, gradually increasing and decreasing and coming to a full check at the extremes of movement, so that the device operates precisely the same in both directions of movement. I do not therefore, limit myself to the precise details set forth, but consider myself at liberty to make such changes and alterations as fairly fall within the spirit and scope of the appended claims.

Having thus described my invention, what I claim as new and desire to secure by Letters Patent is:

1. A shock absorber, comprising a casing of maximum diameter intermediate its ends, and cylindrical in form, said casing of least diameter and cylindrical in form at both ends, the walls of said casing tapering from its intermediate portion toward its ends, a rod projecting through the casing, and a piston on the rod of a diameter fitting the smallest diameter of the casing at its ends, said piston having an annular groove in its periphery and having ports connecting the groove with the respective faces of the piston, the ports extending to one face of the piston being out of alinement with the ports extending to the opposite face of the piston, substantially as described.

2. A shock absorber, comprising a casing of maximum diameter intermediate its ends, and cylindrical in form, said casing of least diameter and cylindrical in form at both ends, the walls of said casing tapering from its intermediate portion toward its ends, a rod projecting through the casing, a piston on the rod having annular flanges at its ends fitting the smallest diameter of the casing at the ends of the latter, and said piston having ports connecting the periphery of the piston between the flanges with the respective faces of the piston, and check valves controlling said ports, substantially as described.

3. A shock absorber, comprising a casing of maximum diameter intermediate its ends and cylindrical in form, said casing of least diameter and cylindrical in form at both ends, the walls of said casing tapering from its intermediate portion toward its ends, a rod projecting through the casing, a piston secured on the rod and having an annular groove therein, said piston having ports connecting the grooved portion with the opposite faces of the piston, and check valves controlling the ports, substantially as described.

4. A shock absorber, comprising a casing of maximum diameter intermediate its ends, and cylindrical in form, said casing of least diameter and cylindrical in form at both ends, the walls of said casing tapering from its intermediate portion toward its ends, a rod projecting through the casing, a piston secured to the rod in the casing, said piston having annular flanges adjacent its edges of a diameter to fit the smallest diameter of the casing at its ends, said piston having an annular groove between the flanges, and having ports connecting the groove with the respective faces of the piston, and check valves secured to the piston and controlling said passages, substantially as described.

5. A shock absorber comprising a casing largest in diameter at its intermediate portion and tapering toward both ends, a rod extending through the casing, a piston fixed to the rod in the casing and having an annular groove, said piston having passages connecting the groove with the opposite faces of the piston, and check valves controlling said ports, substantially as described.

In testimony whereof I have signed my name to this specification in the presence of two subscribing witnesses.

GARIBALDI DE FERNANZO.

Witnesses:
M. E. DITTUS,
CHAS. E. POTTS.